United States Patent [19]

Tsuji et al.

[11] Patent Number: 6,162,562

[45] Date of Patent: Dec. 19, 2000

[54] SECONDARY CELL COMPRISING A POSITIVE ELECTRODE CONTAINING POLYANILINE AND 4 DIAZO COMPOUND

[75] Inventors: Taishi Tsuji; Kazuto Sakemura; Takashi Yamada; Takako Miyake; Shuuichi Yanagisawa, all of Tsurugashima, Japan

[73] Assignee: Pioneer Electronic Corporation, Tokyo, Japan

[21] Appl. No.: 09/179,427

[22] Filed: Oct. 27, 1998

[30] Foreign Application Priority Data

Oct. 28, 1997 [JP] Japan ................................. 9-295892
Oct. 28, 1997 [JP] Japan ................................. 9-295916

[51] Int. Cl.$^7$ .................................................. H01M 10/24
[52] U.S. Cl. ...................................... 429/213; 429/231.95
[58] Field of Search ............................ 429/231.95, 231.8, 429/213

[56] References Cited

U.S. PATENT DOCUMENTS 6,013,393  1/2000  Taniuchi et al. ........................ 429/303

*Primary Examiner*—Maria Nuzzolillo
*Assistant Examiner*—Monique Wills
*Attorney, Agent, or Firm*—Sughrue, Mion, Zinn, Macpeak & Seas, PLLC

[57] ABSTRACT

The present invention is directed to a secondary cell having a positive electrode composed of polyaniline, wherein the positive electrode is formed by deriving an organic solution of polyaniline mixed with a diazo compound on a specific positive electrode collector. The invention also relates to a lithium ion secondary cell having a positive electrode composed of polyaniline and a diazo compound and a negative electrode composed of graphite, wherein the solvent of the electrolyte is a mixed solvent of ethylene carbonate, γ-butyrolactone and 1,2-dimethoxyethane.

8 Claims, 1 Drawing Sheet

FIGURE
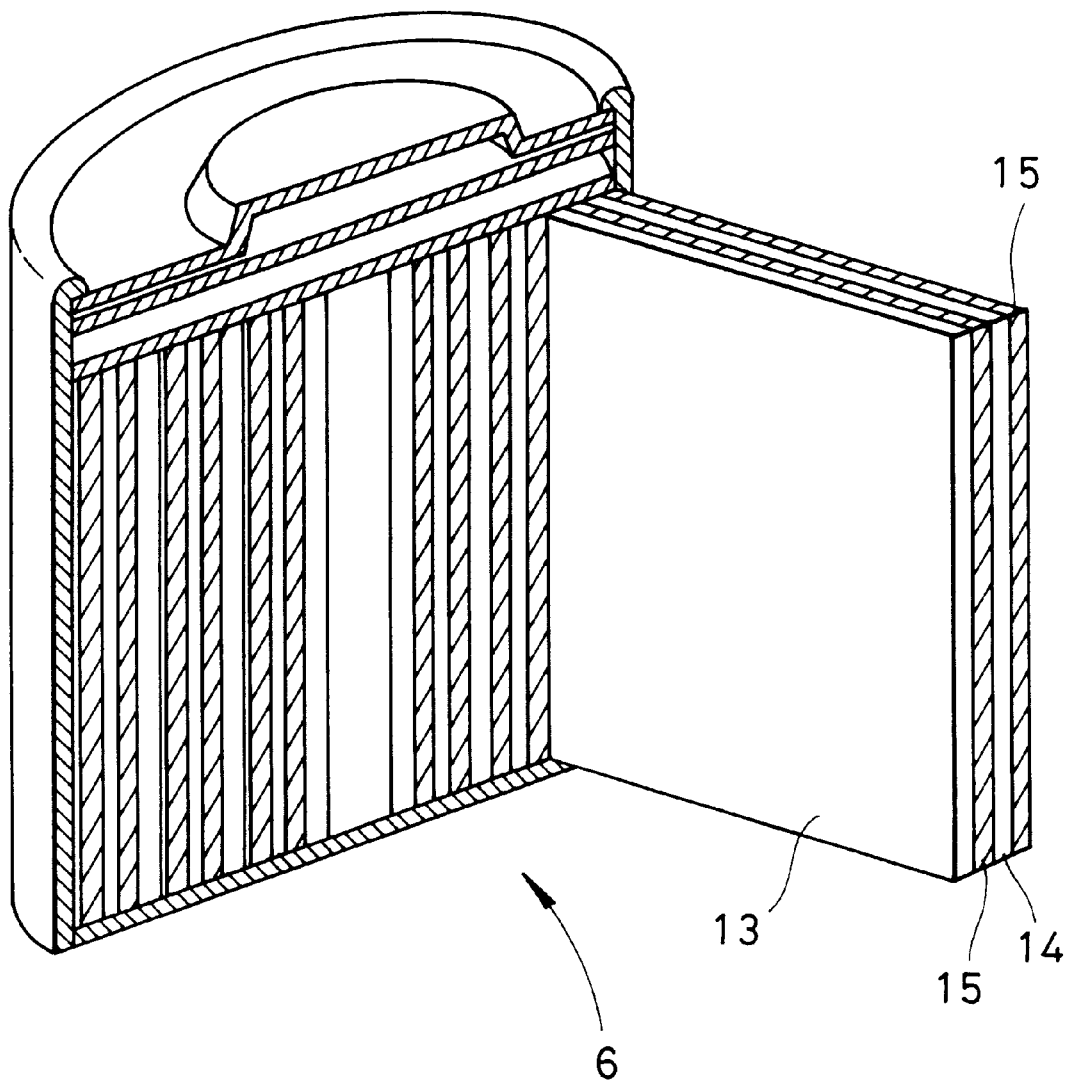

SECONDARY CELL COMPRISING A POSITIVE ELECTRODE CONTAINING POLYANILINE AND 4 DIAZO COMPOUND

BACKGROUND OF THE INVENTION

1. Field of the Invention

The present invention relates to a storage cell or secondary cell in electrochemical cells, and more particularly, to a polymer secondary cell and a lithium ion secondary cell.

2. Description of the Related Art

There are known a lead storage battery, a nickel-cadmium battery, a nickel-hydrogen battery and a lithium ion battery as secondary batteries. In recent years, the lithium ion storage cell has attracted attention because of the high energy density and the high potential thereof for allowing a lightweight storage battery.

For example, the lithium ion storage cell comprises; a positive electrode having a positive electrode layer of $LiCoO_2$ or the like formed on a positive electrode collector; a negative electrode having a negative electrode layer of graphite or the like formed on a negative electrode collector; and a separator. The lithium ion storage cell is constructed in a such a manner that the positive and negative electrodes are wrapped while separated by the separator in a container filled with an organic electrolyte containing $LiPF_6$ or the like and sealed. In addition, the separator for insulating the positive and negative electrodes consists of a porous insulator so as not to inhibit ion transmission within the electrolyte. For example, during charging, Li cations move from the positive electrode layer to the negative electrode layer through the separator, while during discharging, Li cations move from the negative electrode layer to the positive electrode layer through the separator.

Another lithium ion storage cell has also been developed in which a polymer positive electrode is used instead of $LiCoO_2$ of the positive electrode for reduced weight and greater safety. In this lithium ion storage cell, the use of polyaniline as the positive electrode active substance has attracted attention in recent years due to its excellent environmental safety, large charging and discharging capacity and excellent durability.

Electrochemical and chemical oxidation processes are known as methods for producing the polyaniline used for the positive electrode of a non-aqueous secondary cell such as a lithium ion storage cell.

In the case of producing polyaniline using an electrochemical process, the polymer is obtained in the form of a film on the positive electrode, but this is industrially disadvantageous since it requires a large amount of electrical energy. In addition, since the resulting porous film has a low level of strength and easily comes off the electrode, various types of post-processing are difficult. It is also not easy to produce the film having a large surface areas for the secondary cell.

On the other hand, in the case of using a chemical oxidation process, since the polyaniline is normally obtained in the form of a powder, the polyaniline powder must be processed by means such as a press forming so as to use it as the positive electrode for a secondary cell. Moreover, the resulting press formed product is brittle and easily broken. Thus, it is not easy to form the polyaniline into a thin film. Moreover, in the case of using the polyaniline powder in the form of an organic solution and obtaining a film from that solution, the density of the film is high, and particularly when it has a large thickness, the charging and discharging characteristics of the lithium ion cell tend to be extremely inferior.

In a lithium ion storage cell in which graphite is used as the negative electrode, in the case of using a propylene carbonate-based electrolyte, the propylene carbonate decomposes as a result of charging and discharging, resulting in extremely poor cycle characteristics. In the case of using an ethylene carbonate-based electrolyte, cycle characteristics are improved. However, since ethylene carbonate has a high melting point of 36.4° C., discharge capacity at a low temperature is extremely small.

Moreover, in the case of using the conductive polymer e.g., polyaniline, for the positive electrode, the lithium ion storage cell does not operate at a low temperature simply by raising the ion conductivity of the electrolyte at a low temperature by increasing the ratio of low viscosity solvent of the electrolyte.

OBJECTS AND SUMMARY OF THE INVENTION

In consideration of the above problems, the present invention has been accomplished, and the object of the invention is to provide a lithium ion secondary cell that is able to attain stable discharging characteristics. In addition, another object of the present invention is to improve the aging characteristics and low-temperature characteristics of the non-aqueous secondary cell using the positive electrode formed of polyaniline powder obtained by the chemical oxidation.

Another object of the present invention is to provide a lithium ion secondary cell having the characteristics of highly discharging at a low temperature.

A secondary cell according to the present invention comprises a positive electrode composed of polyaniline, wherein the positive electrode is formed by deriving an organic solution of polyaniline mixed with a diazo compound on a predetermined positive electrode collector.

A production process of a secondary cell according to the present invention having a positive electrode composed of polyaniline comprises the steps of:

preparing a mixed organic solution of polyaniline and diazo compound by dissolving polyaniline and a diazo compound in N-methylpyrrolidone;

deriving said polyaniline-diazo compound mixed organic solution onto a predetermined positive electrode collector; and heating said positive electrode collector carrying the polyaniline-diazo compound mixed organic solution to form a positive electrode.

In an embodiment of the secondary cell, said diazo compound contains a substituted or unsubstituted phenyl group and has —N═N— or —N═N—NH— molecular bonds.

In an embodiment of the secondary cell, said diazo compound is one selected from substances consisting of diazoaminobenzene, 1-methyl-3-p-tolyltriazene, 1-benzyl-3-p-tolyltriazene, p-phenylazoaniline, azobenzene and 1,2,3-benzotriazole.

In an embodiment of the secondary cell, said positive electrode is composed by laminating a plurality of films formed by heating an organic solvent of polyaniline mixed with said diazo compound.

Furthermore, a lithium ion secondary cell according to the present invention comprises: an electrolyte wherein a solvent of said electrolyte is a mixed solvent of ethylene carbonate, γ-butyrolactone and 1,2-dimethoxyethane; a positive electrode composed of polyaniline; and a negative electrode composed of graphite.

In an embodiment of the secondary cell, the electrolyte contains $LiBF_4$ as a solute thereof.

In an embodiment of the secondary cell, the electrolyte contains LiPF$_6$ as a solute thereof.

In an embodiment of the secondary cell, the solvent of said electrolyte comprises a mixture of ethylene carbonate, γ-butyrolactone and 1,2-dimethoxyethane mixed at a volume ratio of ethylene carbonate: γ-butyrolactone: 1,2-dimethoxyethane =30 to 50:20 to 40:30.

Still furthermore, a lithium ion secondary cell according to the present invention comprises: an electrolyte wherein a solvent of said electrolyte is a mixed solvent of ethylene carbonate and methylethyl carbonate; and a negative electrode composed of graphite.

In an embodiment of the secondary cell, the electrolyte contains LiPF$_6$ as a solute thereof.

In an embodiment of the secondary cell, the solvent of said electrolyte is a mixture of ethylene carbonate and methylethyl carbonate mixed at a volume ratio of ethylene carbonate: methylethyl carbonate=30:70.

BRIEF DESCRIPTIONS OF THE DRAWING

The accompanying drawing is a partially cutaway schematic perspective view of a secondary cell of an embodiment according to the present invention.

DETAILED DESCRIPTION OF THE PREFERRED EMBODIMENTS

The preferred as embodiments according to the present invention is specifically described below by referring to the drawing.

The inventor of the present invention found that, in the case of obtaining a film of polyaniline (which may be also referred as PAn hereinafter) by dissolving a PAn powder synthesized by chemical oxidation in the organic solvent, N-methylpyrrolidone (which may be also referred as NMP hereinafter), coating this solution on a substrate, namely a collector such as stainless steel foil, and evaporating the solvent by heating, the resulting film has a high density and charging and discharging characteristics tend to be extremely inferior especially when the film thickness is large. Therefore, in order to improve charging and discharging characteristics, the inventor of the present invention found that by obtaining a diazo compound mixed PAn film by bar coating a PAn/NMP solution containing a mixture of dissolved diazo compounds such as diazoaminobenzene (which may be also referred as DAB hereinafter), 1-methyl-3-p-tolyltriazene (which may be also referred as MTTA hereinafter), 1-benzyl-3-p-tolyltriazene, p-phenylazoaniline, azobenzene and 1,2,3-benzotriazole onto stainless steel foil, drying at 80° C. for 20 minutes, and heating, more specifically baking for 30 minutes in a vacuum at 130° C., the charging and discharging properties of a lithium ion secondary cell in which it is used are improved, thereby leading to completion of the present invention. In addition, the diazo compound contains a substituted or unsubstituted phenyl group, has an —N=N— molecular bond, and includes diazoamino compounds having —N=N—NH— molecular bonds.

In particular, improvement of low-temperature characteristics is observed in lithium ion secondary cells in which the positive electrode consists of a diazoamino compound mixed PAn film obtained from a solution in which diazoamino compounds having —N=N—NH— bonds in their molecules, such as diazoaminobenzene or 1-methyl-3-p-tolyltriazene, are mixed and dissolved in PAn/NMP solution.

As shown in the drawing, the secondary cell of the present invention has a wound structure of a positive electrode 13 and a negative electrode 14. The positive electrode 13 consists of a positive electrode layer and a positive electrode collector. The positive electrode layer is formed in such a manner of deriving or plastering an organic solution of polyaniline mixed with a diazo compound onto the positive electrode collector and then baking or heating them. The negative electrode 14 is composed of a negative electrode layer of graphite or the like and a negative electrode collector formed on the negative electrode layer. The lithium ion storage cell is constructed in a such a manner that the positive and negative electrodes 13 and 14 are wrapped and wound about a core while separated by a separator 15 in a sealed container filled with an organic electrolyte 6. Moreover, improvement of low-temperature characteristics is also observed in a secondary cell in which the positive electrode 13 shown in the drawing is in the form of a multilayer structure consisting of a base layer that makes contact with a positive electrode collector, and a plurality of diazo compound mixed PAn films further laminated on top of said base layer.

EMBODIMENT 1

Low-temperature characteristics of lithium ion secondary cells were evaluated for the effects of six types of diazo compound mixed in PAn films thereof in comparison with a standard PAn film not mixed with a diazo compound.

a) Preparation of Lithium Ion Cells having PAn Films Mixed with Diazo Compound and Not Mixed with Diazo Compound PAn was dissolved in NMP to a concentration of 10 wt % to prepare a PAn 10 wt % NMP solution (PAn/NMP (10 wt %)) for a standard (7).

Six types of diazo compounds were prepared. These consisted of (1) DAB, (2) MTTA, (3) 1-benzyl-3-p-tolyltriazene, (4) p-phenylazoaniline, (5) azobenzene and (6) 1,2,3-benzotriazole. It should be noted that a PAn solution not mixed with diazo compound to serve as the basis for comparison was designated as (7).

The above-mentioned diazo compounds (1) through (6) were mixed and dissolved in the above-mentioned PAn 10 wt % NMP solution so that the respective mixing ratios (PAn/NMP (10 wt %): diazo compounds (1) through (6)) were 100:1 (weight ratio) to prepare the six types of diazo compound mixed PAn solutions (1) through (6).

A pair of stainless steel spacers having a film thickness of 600 μm were arranged on a stainless steel foil having a film thickness of 20 μm on a substrate, after which the above-mentioned solutions (1) through (7) were injected between them. The surface above the stainless steel spacers was uniformly spread with a bar (bar coating).

Next, the entire substrate was dried at 80° C. for 20 minutes and then heated to 130° C. and baked in a vacuum to prepare films corresponding to each solution.

A circular patch measuring 16 mm in diameter was cut out from each film to prepare positive electrodes (1) through (6) composed of polyaniline and diazo compound and reference positive electrode (7) composed of polyaniline only on respective stainless steel foil collectors.

Next, the negative electrode composed of natural graphite was prepared in the manner described below.

Firstly, a slurry for coating was prepared consisting of natural graphite, polyvinylidene fluoride (which may be also referred as PVDF hereinafter), NMP and oxalic acid.

Next, the above-mentioned coating slurry was supplied onto a copper foil (whose thickness is 18 μm) on a substrate followed by bar coating using stainless steel spacers having a film thickness of 200 μm.

Finally, the entire substrate was baked at 80° C. for 1 hour and a natural graphite negative electrode was prepared by cutting out a circular patch measuring 16 mm in diameter from the resulting film. Next, an electrolyte was prepared by adding 1 mol of solute in the form of $LiBF_4$ to a solvent containing a mixture of ethylene carbonate (which may be also referred as EC hereinafter), γ-butyrolactone (which may be also referred as γ-BL hereinafter) and 1,2-dimethoxyethane (which may be also referred as DME hereinafter) at a volume ratio of EC: γ-BL DME=30:40:30.

Finally, the positive electrodes, polypropylene separator, negative electrodes and electrolyte were placed in a container to prepare the lithium ion storage cells.

b) Conditions for Charging and Discharging of Lithium Ion Cells

Charging was performed for 3 hours using a constant current of 0.2 mA/cm$^2$ and ending voltage of 3.7 V. Discharging was performed using a constant current of 0.2 mA/cm$^2$ and ending voltage of 2.6 V.

c) Evaluation of Discharge Capacity of Lithium Ion Cells at a Low Temperature The lithium ion storage cells were held at room temperature, −10° C. and −20° C. followed by measurement of discharge capacity. The ratios of discharge capacity at low temperatures of −10° C. and −20° C. were compared with the case of assigning a value of 100% to the discharge capacity of the lithium ion storage cells at room temperature respectively. Those results are shown in Table 1.

TABLE 1

| | | Low-temperature characteristics (vs. room temperature) | |
|---|---|---|---|
| Mixed diazo compound | Room temp. discharge capacity | −10° C. | −20° C. |
| (1) Diazoaminobenzene | 0.676 mAh | 95.7% | 77.2% |
| (2) 1-methyl-3-p-tolyltriazene | 0.596 mAh | 99.3% | 81.3% |
| (3) 1-benzyl-3-p-tolyltriazene | 0.710 mAh | 84.5% | 67.3% |
| (4) p-phenylazoaniline | 0.710 mAh | 87.0% | 63.7% |
| (5) Azobenzene | 0.648 mAh | 83.1% | 56.5% |
| (6) 1,2,3-benzotriazole | 0.628 mAh | 76.4% | 37.4% |
| (7) None | 0.626 mAh | 78.7% | 32.2% |

As is clear from Table 1, the low-temperature characteristics of secondary cells were good in the order of (2)>(1)>(3)>(4)>(5)>(6)>(7) since each secondary cell has a polyaniline positive electrode prepared by mixing diazo compounds containing substituted or unsubstituted phenyl groups and having —N=N— or —N=N—NH— bonds. In particular, the secondary cells having containing diazoamino compound having —N=N—NH— bonds in their molecules, such as diazoaminobenzene and 1-methyl-3-p-tolyltriazene were especially effective.

EMBODIMENT 2

Low-temperature characteristics were evaluated when diazo compound mixed PAn films were laminated in lithium ion secondary cells.

a) Preparation of Lithium Ion Cells having PAn Films Mixed with Diazo Compound and Not Mixed with Diazo Compound PAn was dissolved in NMP to a concentration of 10 wt % to prepare PAn 10 wt % NMP solution (PAn/NMP (10 wt %)).

Firstly, DAB solution was prepared by mixing DAB to a PAn 10 wt % NMP solution so that the mixing ratio of PAn/NMP (10 wt %):DAB became 100:1 (weight ratio) for the base layer of the positive electrode.

Next, MTTA solution was prepared by mixing MTTA to a PAn 10 wt % NMP solution so that the mixing ratio of PAn/NMP (10 wt %):MTTA became 100:1 (weight ratio) for the laminating layers to be laminated over the base layer.

A pair of stainless steel spacers having a film thickness of 600 μm were arranged on a stainless steel foil having a film thickness of 20 μm on a substrate, after which the above-mentioned DAB solution for the base was injected between them. The surface above the stainless steel spacers was uniformly spread with a rod-like member, i.e. a bar. On the other hand, the MTTA solution for the laminating layers was bar coated onto a glass substrate using stainless steel spacers having a film thickness of 600 μm.

Next, the substrates were dried for 15 minutes at 80° C. and then heated to 130° C. and baked in a vacuum to prepare films corresponding to each solution.

After baking, the PAn film for lamination was peeled from the glass substrate, and three layers of the PAn film for lamination were laminated in order onto the PAn film for the base.

In this manner, the positive electrode was formed into a laminated structure consisting of a base layer and diazo compound mixed PAn film laminated layers.

Next, a film of lithium metal having a film thickness of 0.2 mm was used for the negative electrode.

Next, an electrolyte was prepared by adding 1 mol of solute in the form of $LiBF_4$ to a solvent containing a mixture of ethylene carbonate (EC), γ-butyrolactone (γ-BL) and 1,2-dimethoxyethane (DME) (EC: γ-BL): DME=30:40:30 in the volume ratio).

Finally, the positive electrodes, polypropylene and glass non-woven fiber separator, negative electrodes and the electrolyte were placed in a container to prepare the lithium ion storage cells.

b) Conditions for Charging and Discharging of Lithium Ion Cells

Charging was performed for 3 hours using a constant current of 0.2 mA/cm$^2$ and ending voltage of 3.7 V. Discharging was performed using a constant current of 0.2 mA/cm$^2$ and ending voltage of 2.6 V.

c) Evaluation of Discharge Capacity of Lithium Ion Cells at a Low Temperature The lithium ion storage cells were held at room temperature and −20° C. followed by measurement of discharge capacity. The ratio of discharge capacity at a low temperature of −20° C. was compared with the case of assigning a value of 100% to the discharge capacity of the lithium ion storage cells at room temperature. Those results are shown in Table 2.

TABLE 2

| Mixed diazo compound in PAn Laminated Film | Discharge capacity at room temperature | −20° C. (vs. room temperature) |
|---|---|---|
| Yes | 2.590 mAh | 55.5% |
| No | 2.708 mAh | 29.3% |

A difference was observed in the low-temperature characteristics between the lithium ion secondary cell containing a diazo compound and that not containing a diazo compound, with the lithium ion secondary cell containing a diazo compound demonstrating good low-temperature characteristics.

EMBODIMENT 3

The aging characteristics dependent on diazo compound mixed PAn film were evaluated in lithium ion secondary cells using an electrolyte different from that used in the above embodiments based on the maximum discharge capacity and the number of cycles required for the maximum discharge capacity.

a) Preparation of Lithium Ion Cells having PAn Films Mixed with Diazo Compound and Not Mixed with Diazo Compound The positive electrode employed a single-layer structure and DAB was used for the mixed diazo compound. Lithium ion secondary cells were prepared in the same manner as the above embodiments with the exception of using (1) electrolyte in which 1 mol of $LiPF_6$ was added as solute to a solution containing a mixture of EC and methylethyl carbonate (which may be also referred as MEC hereinafter) at a ratio of EC:MEC=30:70 in the volume ratio, and (2) electrolyte in which 1 mol of $LiPF_6$ was added as solute to a solution containing a mixture of propylene carbonate (which may be also referred as PC hereinafter) and diethyl carbonate (which may be also referred as DEC hereinafter) at a ratio of PC:DEC=50:50 in the volume ratio.

b) Conditions for Charging and Discharging of Lithium Ion Cells

Charging was performed for 6 hours using a constant current of 0.2 $mA/cm^2$ and ending voltage of 3.9 V. Discharging was performed using a constant current of 0.2 $mA/cm^2$ and ending voltage of 2.8 V.

c) Evaluation of Aging Characteristics of Lithium Ion Cells

Aging characteristics were evaluated in terms of the maximum discharge capacity of the lithium ion storage cells and the number of cycles required for that maximum discharge capacity, namely the number of aging cycles. Those results are shown in Table 3.

TABLE 3

| Mixed diazo compound | Maximum discharge capacity | No. of aging cycles |
| --- | --- | --- |
| (1) $LIPF_6$ 1 mol/l, EC:MEC = 30:70 vol % | | |
| Yes | 113 mAh/g | 13 cycles |
| No | 78 mAh/g | 47 cycles |
| (2) $LiPF_6$ 1 mol/l, PC:DEC = 50:50 vol % | | |
| Yes | 77 mAh/g | 94 cycles |

For both electrolytes (1) and (2), diazo compound mixed PAn films demonstrated larger discharge capacities with fewer numbers of aging cycles than PAn films not mixed with the diazo compound.

SECOND EMBODIMENT

The following provides an explanation of another embodiment according to the present invention.

A non-aqueous solvent is used for the storage cell system using lithium. This was done because lithium is a stronger reductant than hydrogen (ends up reacting with water). Examples of non-aqueous solvents include ethylene carbonate (EC), propylene carbonate (PC), γ-butyrolactone (γ-BL), 1,2-dimethoxyethane (DME), dimethyl carbonate (which may be also referred as DMC hereinafter), diethyl carbonate (DEC), diethyl ether (which may be also referred as DEE hereinafter) and tetrahydrofuran (which may be also referred as THF hereinafter).

The following characteristics of non-aqueous solvents shown by Table 4 are taken into consideration for these solvents.

TABLE 4

| Solvent | Coagu. point ° C. | Boil. point ° C. | Viscosity mP | Dielectric constant | Donor number | Acceptor number |
| --- | --- | --- | --- | --- | --- | --- |
| EC | 36.4 | 248 | 18.5 | 89.6 | 16.4 | — |
| PC | −49 | 241 | 25.3 | 64.4 | 15.1 | 18.3 |
| γ-BL | −43 | 202 | 17.5 | 39.1 | — | — |
| DME | −58 | 85 | 4.6 | 7.2 | 20 | — |
| DMC | 3 | 90 | 6.3 | — | — | — |
| DEC | −43 | 127 | 7.5 | 2.8 | — | — |
| DEE | −116.3 | 34.6 | 2.2 | 4.3 | 19.2 | 3.9 |
| THF | −108.5 | 66 | 4.6 | 7.6 | 20 | 8.0 |
| $H_2O$ | 0 | 100 | 8.9 | 78.3 | 18.0 | 54.8 |

The melting point (or coagulating point) and boiling point of the solvent define the operating temperature range of the storage cell.

The viscosity of the solvent has an effect on ion movement in the solvent in the form of viscous resistance. In a solvent having a low viscosity, ions are able to move easily resulting in an increased conductivity.

The dielectric constant of a solvent is related to the property by which solute dissolved in the solvent separates into cations and anions. When electrostatic charges q+ and q− present in a solvent having a dielectric constant $\in_r$ are separated by distance r, the Coulomb's force F that acts between the two is defined as $F = q+ \cdot q-/(4\pi \in_o \in_r r^2)$ when the dielectric constant in a vacuum is taken to be $\in_o$. As the dielectric constant of a solvent increases, Coulomb's force F between the cations and anions decreases, thereby facilitating dissociation into ions.

The donor number represents the degree of the electron donating ability of a solvent, while the acceptor number represents the degree of its electron accepting ability. The donor number is related to the size of the solvated cations, while the acceptor number is related to the size of the anions. The size of solvated ions is related to the ease of dissociation into ions and the mobility of those ions.

In order to increase the conductivity, it is necessary that the solvent have strong ability to dissociate electrolyte into ions and facilitate movement of dissociated ions, or in other words, that the solvent have a large dielectric constant and low viscosity. In this sense, although water is the optimum electrolyte, it unfortunately cannot be used. In actuality, solvents having large dielectric constants and solvents having low viscosities are used in the form of mixtures.

Lithium salt is used for the electrolyte of lithium storage cells. Specific examples of these include $LiClO_4$, $LiBF_4$, $LiPF_6$, $LiAsF_6$ and $LiCF_3SO_3$.

The ion conductivity increases as the number of dissociated free ions becomes greater and as the movement of the ions becomes faster. Dissociation of ion pairs into free ions is accelerated as the sum of the solvent dielectric constant and crystal ion radius of the electrolyte salt becomes greater. In other words, in order to increase the number of free ions, it is desirable to increase the dielectric constant of the solvent and increase the crystal ion radius of the lithium salt. However, since electrostatic attraction acts between the positive and negative ends of corresponding polar molecules, solvents having large intramolecular polarization and a high dielectric constant typically exhibit a relatively high viscosity making it difficult for ions to move in those solvents. In contrast, by employing a mixed system of a solvent having a high dielectric constant and a solvent having a low dielectric constant, viscosity can be held to a lower value than the additive sum of the viscosities of each individual solvent, thereby making it possible to increase the ion conductivity. In addition, solvent viscosity increases as a result of mixing electrolyte salt into a solvent. The higher the concentration of electrolyte salt, the greater the viscosity of the electrolyte. Since this ends up making it difficult for ions to move in the solvent, electrolyte salt must be dissolved at the optimum concentration.

Other important properties of electrolytes include freezing point, boiling point and density. The freezing point affects the low-temperature characteristics of the storage cell. If the electrolyte freezes at a low temperature, ion movement is restricted thereby preventing charging and discharging of the storage cell. In consideration of the practical working temperature range of the storage cell, it is necessary that the freezing point of the electrolyte be at least lower than −20° C. If PC having a low freezing point (−49° C.) is used for the electrolyte, this objective can be easily achieved. However, PC is unstable with respect to graphite negative electrodes, and since stable EC has a high freezing point of 36.4° C., it ends up freezing at room temperature. The freezing point of an electrolyte can be lowered by dissolving electrolyte salt and by forming an eutectic structure by mixing with another solvent. In the case of the former, the decrease in freezing point is small, being only several degrees at most. The freezing point lowers when electrolyte concentration increases, but the electrolyte is subjected to restrictions due to a decreased ion conductivity and solubility. The latter method can be more effective.

Since lithium ion storage cells preferably use natural graphite for the negative electrode, the present inventor proposed using an electrolyte consisting of an EC solution in order to ensure good charging and discharging characteristics. In order to improve low-temperature characteristics to compensate for the use of EC, an eutectic structure was formed with γ-BL, which is a high dielectric constant solvent and has a low freezing point of −43° C. In addition, since it was determined experimentally that mixing DME rather than DEC for the low-viscosity solvent results in better low-temperature characteristics, a ternary eutectic structure was formed with DME. The case where DME was mixed with the solvent resulted in good low-temperature characteristics. It can be thought to be the result of synergy with the polyaniline of the positive electrode, although the mechanism is unknown.

Therefore, the present inventor attempted to improve low-temperature discharge characteristics by optimizing the electrolyte of a non-aqueous secondary cell using the electrically conductive polymer, polyaniline, for the positive electrode and graphite for the negative electrode, by manipulating the solvents mixed and their mixing ratios. Therefore, experiments were conducted while focusing on the fact that the freezing point of the electrolyte in the form of a mixed solvent is able to be lowered by adding DME, and the overall dielectric constant can be increased by adding γ-BL, having a high dielectric constant, since DME has a low dielectric constant $\in_r$. This is because, as the dielectric constant becomes higher, the Coulomb's force that acts between ions becomes smaller, resulting in greater ease of dissociation.

As a result of conducting various experiments, when a mixed solvent of EC, γ-BL and DME was used for the electrolyte of $LiBF_4$ (lithium boron tetrafluoride) and $LiPF_6$ (lithium phosphate hexafluoride), the present inventor found that low-temperature characteristics were good. It was possible to produce a storage cell having greater electromotive force than that in the case of using an electrolyte of an aprotic solvent.

As shown in the drawing, the secondary cell of this second embodiment of the present invention has also a wound structure in which, a positive electrode 13 consists of a positive electrode layer of polyaniline formed on a positive electrode collector, and a negative electrode 14 on which a negative electrode layer composed of graphite or the like is formed on a negative electrode collector, are wound while separated by a separator 15 in a sealed container filled with an organic electrolyte 6 comprising a mixed solvent of ethylene carbonate, γ-butyrolactone and 1,2-dimethoxyethane.

EMBODIMENT 4

The discharge capacities at low temperatures (−10° C., −20° C.) were evaluated of lithium ion secondary cells using ten types of electrolytes.

a) Preparation of Lithium Ion Batteries having PAn Films Mixed with Diazo Compound and Not Mixed with Diazo Compound Polyaniline (PAn) powder was synthesized by chemical oxidation and dissolved in the organic solvent, N-methylpyrrolidone (NMP). After coating this solution onto a collector substrate, namely on a collector such as stainless steel foil, it was dried for 1 hour at 80° C. to prepare a PAn film. A circle measuring 16 mm in diameter was then punched out from the film to prepare a positive electrode.

Next, the negative electrode was prepared from natural graphite in the manner described below.

Firstly, a coating slurry composed of natural graphite, polyvinylidene fluoride, NMP and oxalic acid was supplied onto Cu foil (whose thickness is 18 μm) on a substrate followed by bar coating using stainless steel spacers having a film thickness of 200 μm.

Finally, the entire substrate was baked for 1 hour at 80° C. and circular patches measuring 16 mm in diameter were punched out from the resulting film to prepare the natural graphite negative electrode.

Next, several types of electrolytes were prepared by adding 1 or 2 mol of solute in the form of $LiBF_4$ and $LiPF_6$ to mixed solvents containing several combinations of EC, γ-BL and DME at various volume ratios.

Finally, the positive electrode, polypropylene separator, negative electrode and electrolytes were filled into containers to prepare the lithium ion storage cells.

b) Charging and Discharging Conditions of Lithium Ion Batteries

Charging was performed for 3 hours using a constant current of 0.2 mA/cm$^2$ and ending voltage of 3.7 V. Discharging was performed using a constant current of 0.2 mA/cm$^2$ and ending voltage of 2.6 V.

c) Evaluation of Discharge Capacity of Lithium Ion Batteries at Low Temperatures The lithium ion storage cells were held at room temperature, −10° C. and −20° C. followed by measurement of discharge capacity. The ratios of discharge capacity at low temperatures of −10° C. and −20° C. were compared with the case of assigning a value of 100% to the discharge capacity of the lithium ion storage cells at room temperature. Some of the electrolytes that exhibited good results are shown in Table 5.

TABLE 5

| No. | Electrolyte salt (conc.) | Solvent mixing ratio (vol %) | Discharge capacity (room temp.) | Low-temp. char. (vs. room temp.) −10° C. | −20° C. |
|---|---|---|---|---|---|
| (1) | LiBF$_4$ (2 mol/l) | EC:γ-BL:DME = 50:20:30 | 0.71 mAh | 61.7% | 5.2% |
| (2) | LiBF$_4$ (2 mol/l) | EC:γ-BL:DME = 30:40:30 | 0.73 mAh | 64.0% | 15.4% |
| (3) | LiBF$_4$ (1 mol/l) | EC:γ-BL:DME = 30:40:30 | 0.73 mAh | 77.0% | 41.4% |
| (4) | LiPF$_6$ (1 mol/l) | EC:γ-BL:DME = 30:40:30 | 0.67 mAh | 60.3% | 8.9% |
| (5) | LiBF$_4$ (2 mol/l) | EC:γ-BL:DEC = 50:20:30 | 0.65 mAh | 0% | — |
| (6) | LiPF$_6$ (1 mol/l) | EC:γ-BL:DEC = 50:20:30 | 0.69 mAh | 5.8% | — |
| (7) | LiBF$_4$ (1 mol/l) | EC:DEC = 50:50 | 0.64 mAh | 0% | — |
| (8) | LiPF$_6$ (1 mol/l) | EC:MEC = 30:70 | 0.72 mAh | 30.5% | 3.7% |

As is shown in Table 5, operations of discharge were confirmed at a low temperature of −20° C. for lithium ion storage cells of Nos. (1) through (4) and (8) of the present invention, and practical characteristics were obtained. As is clear from Table 4, it is a fact that mixing ethylene carbonate, γ-butyrolactone and 1,2-dimethoxyethane for the electrolyte solvents in a volume ratio of EC: γ-BL:DME=30 to 50:20 to 40:30 yields preferable results.

What is claimed is:

1. A secondary cell comprising:
a positive electrode composed of polyaniline and a diazo compound.

2. A secondary cell according to claim 1, wherein said diazo compound contains a substituted or unsubstituted phenyl group and has —N=N— or —N=N—NH— molecular bonds.

3. A secondary cell according to claim 1, wherein said diazo compound is one selected from the group consisting of diazoaminobenzene, 1-methyl-3-p-tolyltriazene, 1-benzyl-3-p-tolyltriazene, p-phenylazoaniline, azobenzene and 1,2,3-benzotriazole.

4. A secondary cell according to claim 1, wherein said positive electrode is composed by laminating a plurality of films each composed of said polyaniline mixed with said diazo compound.

5. A process for producing a secondary cell having a positive electrode composed of polyaniline comprising the steps of:

preparing a mixed organic solution of said polyaniline and a diazo compound by dissolving the polyaniline and a diazo compound in N-methylpyrrolidone;

deriving said polyaniline-diazo compound mixed organic solution onto a positive electrode collector; and heating said positive electrode collector carrying the polyaniline-diazo compound mixed organic solution to form a positive electrode.

6. A process according to claim 5, wherein said diazo compound contains a substituted or unsubstituted phenyl group and has —N=N— or —N=N—NH— molecular bonds.

7. A process according to claim 5, wherein said diazo compound is one selected from the group consisting of diazoaminobenzene, 1-methyl-3-p-tolyltriazene, 1-benzyl-3-p-tolyltriazene, p-phenylazoaniline, azobenzene and 1,2,3-benzotriazole.

8. A process according to claim 5, wherein said positive electrode is composed by laminating a plurality of films formed by heating an organic solvent of said polyaniline mixed with said diazo compound.

* * * * *